(12) United States Patent
Nasir et al.

(10) Patent No.: US 11,825,148 B2
(45) Date of Patent: *Nov. 21, 2023

(54) EXPIRING SYNCHRONIZED SUPPLEMENTAL CONTENT IN TIME-SHIFTED MEDIA

(71) Applicant: Rovi Guides, Inc., San Jose, CA (US)

(72) Inventors: Sahir Nasir, San Jose, CA (US); Alexander Liston, Menlo Park, CA (US); Edwin Stephen Mack, Sunnyvale, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,474

(22) Filed: Feb. 16, 2023

(65) Prior Publication Data

US 2023/0276093 A1    Aug. 31, 2023

Related U.S. Application Data

(63) Continuation of application No. 17/506,371, filed on Oct. 20, 2021, now Pat. No. 11,611,793, which is a
(Continued)

(51) Int. Cl.
| | |
|---|---|
| *H04N 21/43* | (2011.01) |
| *H04N 21/2187* | (2011.01) |
| *H04N 21/431* | (2011.01) |
| *H04N 21/472* | (2011.01) |
| *H04N 21/478* | (2011.01) |

(Continued)

(52) U.S. Cl.
CPC ... *H04N 21/43074* (2020.08); *H04N 21/2187* (2013.01); *H04N 21/4302* (2013.01); *H04N 21/4316* (2013.01); *H04N 21/478* (2013.01); *H04N 21/4758* (2013.01); *H04N 21/47217* (2013.01); *H04N 21/488* (2013.01)

(58) Field of Classification Search
CPC ......... H04N 21/43074; H04N 21/2187; H04N 21/4302; H04N 21/4316; H04N 21/47217; H04N 21/4758; H04N 21/478; H04N 21/488; H04N 21/4325; H04N 21/4394; H04N 21/44008
See application file for complete search history.

(56) References Cited

U.S. PATENT DOCUMENTS

| | | |
|---|---|---|
| 7,761,892 B2 | 7/2010 | Ellis et al. |
| 10,856,036 B2 | 12/2020 | Nasir et al. |

(Continued)

*Primary Examiner* — Kunal Langhnoja
(74) *Attorney, Agent, or Firm* — Haley Guiliano LLP

(57) ABSTRACT

Systems and methods are described for providing interactive content contextually related to an occurrence. An illustrative method generates for display, at a media consumption device, a display of the live event, wherein the display of the live event comprises the occurrence, determines a beginning of the occurrence in the display of the live event, in response to determining the beginning of the occurrence in the display of the live event, generates for simultaneous display, with the display of the live event, interactive content related to the occurrence, determines whether the occurrence in the live event has ended in real time, and in response to determining that the occurrence in the live event has ended in real time, ceases the generating for display of the interactive content related to the occurrence.

20 Claims, 12 Drawing Sheets

Related U.S. Application Data continuation of application No. 17/082,298, filed on Oct. 28, 2020, now Pat. No. 11,184,662, which is a continuation of application No. 16/141,206, filed on Sep. 25, 2018, now Pat. No. 10,856,036.

(51) Int. Cl.
  *H04N 21/475* (2011.01)
  *H04N 21/488* (2011.01)

(56) References Cited

U.S. PATENT DOCUMENTS

| | | |
|---|---|---|
| 11,184,662 B2 | 11/2021 | Nasir et al. |
| 11,611,793 B2 | 3/2023 | Nasir et al. |
| 2009/0328109 A1 | 12/2009 | Pavlovskaia et al. |
| 2016/0249115 A1* | 8/2016 | Lincke ................ H04N 21/233 |
| 2017/0072321 A1* | 3/2017 | Thompson ............. A63F 13/61 |
| 2017/0264961 A1* | 9/2017 | Lockton ............... A63F 13/338 |
| 2021/0112299 A1 | 4/2021 | Nasir et al. |
| 2022/0150576 A1 | 5/2022 | Nasir et al. |

* cited by examiner

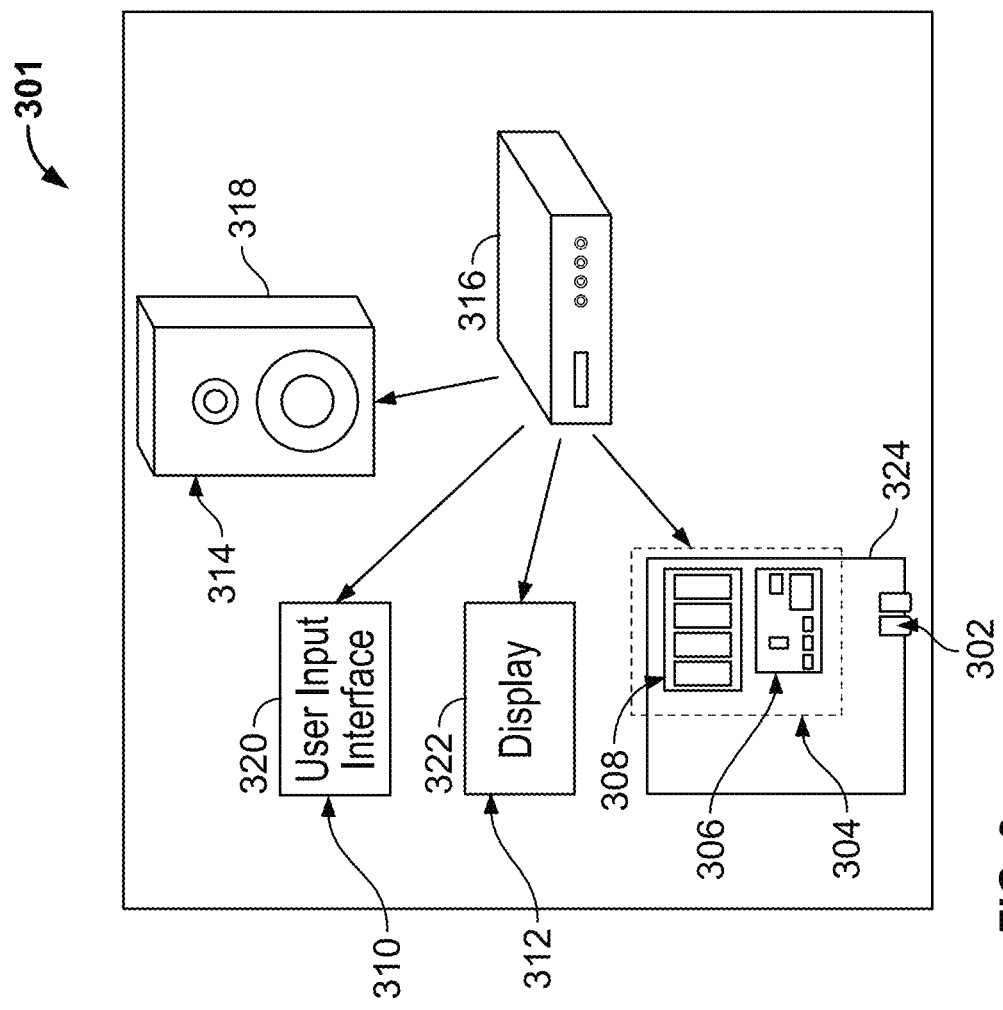
FIG. 3
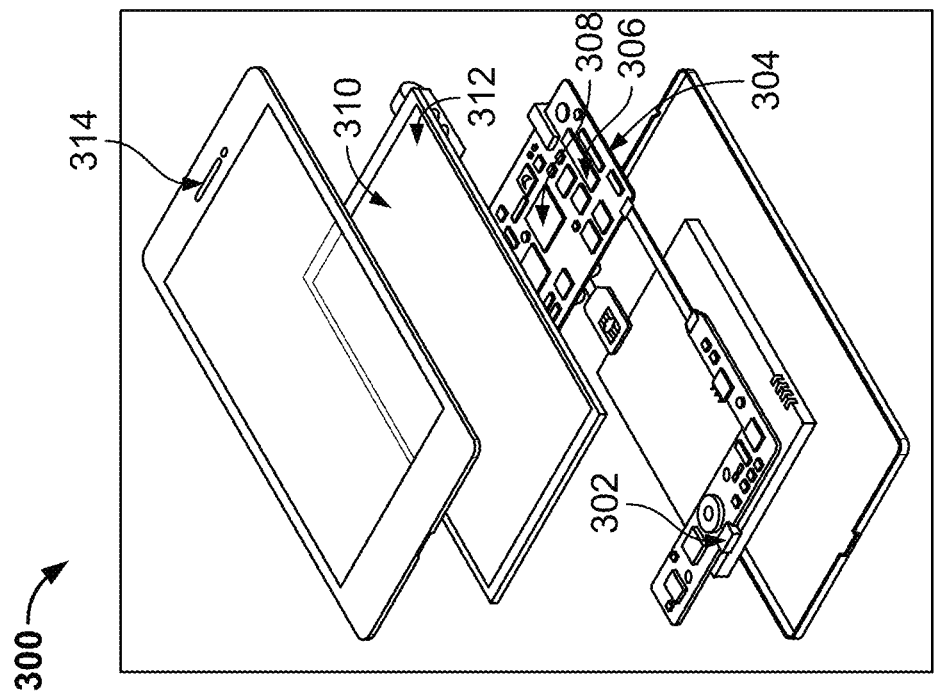

900

902
Begin subroutine for determining the amount of delay between the live event and the display of the live event

↓

904 Has a user action affecting playback of the display of the live event been performed ?

No → END

Yes ↓

906
Calculate an amount of time shifting of the display of the live event caused by the action affecting playback of the display of the live event

↓

908
Calculate a difference between the live event and the currently displayed portion of the display based on the amount of time shifting

FIG. 9

EXPIRING SYNCHRONIZED SUPPLEMENTAL CONTENT IN TIME-SHIFTED MEDIA

CROSS-REFERENCE TO RELATED APPLICATIONS

This application is a continuation of U.S. patent application Ser. No. 17/506,371, filed Oct. 20, 2021, which is a continuation of Ser. No. 17/082,298, filed Oct. 28, 2020, now U.S. Pat. No. 11,184,662, which is a continuation of Ser. No. 16/141,206, filed Sep. 25, 2018, now U.S. Pat. No. 10,856,036, which are hereby incorporated by reference herein in their entireties.

BACKGROUND

The present disclosure relates to expiring synchronized supplemental content in time-shifted media, and more particularly, to systems and methods for preventing display of supplemental content after the end of an occurrence related to the supplemental content.

SUMMARY

Advancements in digital transmission of media content have increased the amount of media content that can be made available to an audience. For example, a digital transmission of media content may include various supplemental content, such as enhanced and/or interactive content, related to the media content. Such supplemental content enhances the user experience and allows the users to interact with the media content. Time-shifting technologies, which enable users to delay playback of a live transmission of media content, have also greatly enhanced the user experience by allowing users to consume the media content and supplemental content at a time of their own choosing (e.g., at a time after the live transmission). But such technologies may cause time-sensitive supplemental content (e.g., supplemental content synchronized with particular portions of media content) to become outdated (e.g., no longer available, no longer accurate, etc.) by the time the users consume a related portion of the media content. Also, even without user-initiated time shifts, these live events typically have a delay between a real-time occurrence and its transmission, which can adversely affect supplemental content.

Accordingly, to overcome such problems, systems and methods are disclosed herein for preventing output of supplemental content synchronized to an occurrence in the media content after the occurrence has ended. In one example embodiment, which will be described further below with reference to the drawings, the media content is a video of a live football game that is being played back on a user's smartphone. The football game includes a field goal attempt (i.e., an occurrence). In the example embodiment, the video is played back at a delay of 30 seconds behind the real-life football game. Thus, what the user sees in the video happened 30 seconds earlier in the real-life football game. When the field goal attempt is displayed in the video, a poll (i.e., supplemental content) asking the user about the predicted outcome of the field goal is displayed on the smartphone simultaneously with the video. The poll is relevant only to users who do not yet know the outcome of the field goal attempt. In that regard, the poll is displayed only from the time that the depiction of the field goal attempt in the video is displayed (i.e., 30 seconds after the field goal attempt in the real-life football game began), until the time that the field goal attempt in the real-life football game ends (i.e., 30 seconds before the depiction of the field goal attempt in the video ends). Thus, to the user watching the video of the football game on the smartphone, the poll will end before the field goal attempt is completed because the user is watching the video of the football game on a 30-second-behind-real-time delay. At the same time, display of the poll should not begin before the user reaches the beginning of the field goal attempt in the delayed playback of the media content, or the user experience may be spoiled by display of a poll related to a field goal that the user does not yet know is about to happen.

Improvements are thus required to enable supplemental content related to live events to be provided during a period of time beginning when the occurrence (e.g., the field goal) is displayed in the delayed playback of the media content that the user is consuming, and ending when the occurrence ends in real time. To that effect, the present disclosure describes systems and methods for determining when an occurrence begins in a delayed playback of media content. For example, the described systems and methods may retrieve metadata associated with the media content and identify, in the metadata, an indication of the beginning of the occurrence in the media content. Alternatively, the systems and methods may determine an amount of delay between the live event and the delayed playback of the media content by determining a time when a currently displayed portion of the media content happened in real time, and comparing that time to the current time. Additionally or alternatively, the amount of delay may be determined by calculating an amount of time-shifting applied to the media content, such as by user actions (e.g., pausing, rewinding, etc.) affecting playback of the media content. The systems and methods may then calculate an offset start time of the occurrence by adding the amount of delay to the start time of the occurrence in real time. In some instances, the systems and methods may determine the beginning of the occurrence in the media content by performing audio or image processing on the media content to identify characteristics (e.g., graphics, sounds (such as cheering or vocal matching), etc.) indicative of the beginning of the occurrence.

Once the beginning of the occurrence in the delayed playback of the media content is determined, the described systems and methods generate, for simultaneous display with the media content, the supplemental content related to the occurrence. For example, the systems and methods may retrieve information related to the occurrence and generate a poll based on the information. The poll may include a question regarding the outcome of the occurrence. In some instances, the supplemental content may be displayed on a second device (i.e., a different device from the device on which the media content is played back), and the second device may receive a user selection of a selectable option (e.g., a poll response) included in the supplemental content. The second device may then transmit an indication of the user selection to a remote device, which may receive indications of user selections from a plurality of devices and aggregate the responses to determine a result of the poll.

The present disclosure further describes systems and methods for determining when an occurrence ends in real time. For example, the disclosed systems and methods may retrieve metadata associated with the media content and identify, in the metadata, an indication of the end of the occurrence in real time. Once it is determined that the occurrence has ended in real time, the systems and methods may cease generating for display the supplemental content related to the occurrence in order to prevent the supplemental content from being displayed after the occurrence has ended in real time. After the occurrence has ended in real time and the supplemental content is no longer displayed, the systems and methods may further determine, using the same or similar methods to those described above for determining the beginning of the occurrence in the media content, whether the occurrence has ended in the delayed playback of the media content. Once the occurrence has ended in the delayed playback of the media content (i.e., once the user has seen the outcome of the field goal attempt), the systems and methods may generate for simultaneous display with the media content, additional supplemental content (e.g., the result of the poll).

In another example embodiment, the media content is a video of a reality television show in which the audience (e.g., the viewers at home) are asked to cast a vote. The voting period starts at a particular point in the show, and ends at midnight two days later. In the example embodiment, a user is watching the show on the night after it was first broadcast. Thus, when the user is watching the show, the voting period has already begun but is not yet over. The supplemental content includes the names and pictures of three contestants in the show for whom the user can cast a vote, an option to enter the user's choice, and an option to submit the vote. In this example, the supplemental content is displayed only after the user reaches the particular point in the delayed playback of the show when the voting is announced, and only if the particular point in the show is played back before the voting period ends (i.e., if the point in the show where the voting period is announced is played back before midnight on the day that is two days after the show was first broadcast). That is, if the show is played back after the voting period ends (i.e., after midnight on the day that is two days after the show was first broadcast), the supplemental content allowing the user to cast a vote will not be displayed. Instead, different supplemental content, such as a notice that the voting period has already ended, may be displayed in place of the supplemental content allowing the user to cast a vote.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows a diagram of illustrative media devices, in accordance with some embodiments of the disclosure;

FIG. 9 is a flowchart of another detailed illustrative process for determining an amount of delay between a live event and a display of a live event, in accordance with some embodiments of the disclosure;

DETAILED DESCRIPTION

Figure 1:
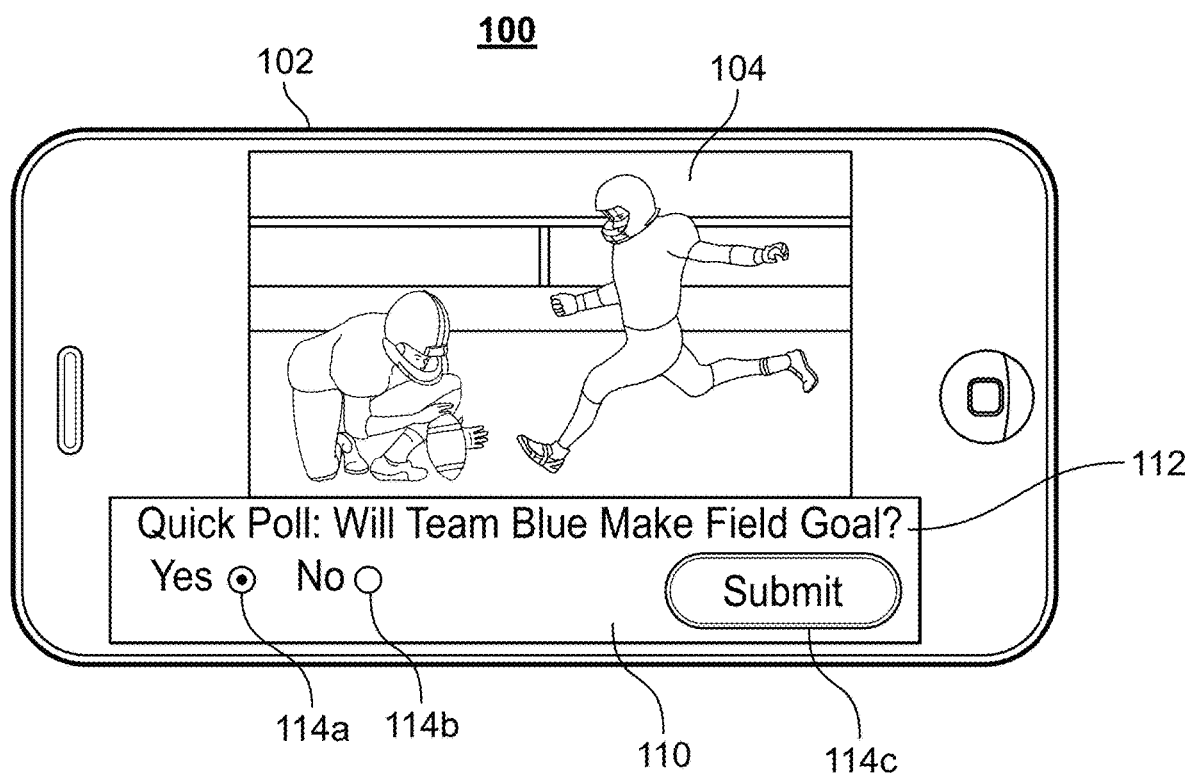
FIG. 1 shows an illustrative example of a user interface for providing supplemental content related to an occurrence during a live event, in accordance with some embodiments of the disclosure.

FIG. 1 shows an illustrative example of a user interface for providing supplemental content related to an occurrence during a live event, in accordance with some embodiments of the disclosure. In particular, FIG. 1 shows a scenario 100 where a media consumption device 102 displays media content 104 including an occurrence during a live event. The media consumption device 102 may be any device for accessing the content described below, such as a television, a Smart TV, a set-top box, an integrated receiver decoder (IRD) for handling satellite television, a digital storage device, a digital media receiver (DMR), a digital media adapter (DMA), a streaming media device, a personal computer (PC), a laptop computer, a tablet computer, a WebTV box, a personal computer television (PC/TV), a PC media server, a PC media center, a handheld computer, a personal digital assistant (PDA), a portable video player, a portable music player, a portable gaming machine, a smartphone, a wearable computer, an augmented and/or virtual reality display device, or any other television equipment, computing equipment, or wireless device, a speaker or other audio output device, and/or any other display device or audio output device usable to consume the media content 104 or combination of the same.

In that regard, the media content may include an electronically consumable media asset, such as include video, audio, still images, virtual and/or augmented reality renderings, television programming, as well as pay-per-view programs, Internet content (e.g., streaming content, downloadable content, Webcasts, etc.), chat sessions, social media, applications, games, and/or any other media or multimedia and/or combination of the same and/or any type, form, or combination of media via which a live event may be presented. The media content 104 may be a broadcast, a stream, a download, and/or any other transmission of a media asset from a content source to the media consumption device 102.

The media consumption device 102 further displays supplemental content 110 including a prompt 112 and a plurality of selectable options 114a, 114b, and 114c. In the example shown in FIG. 1, the media content 104 shows a football game and the supplemental content 110 is a poll. The prompt 112 is a question, and the selectable options 114a, 114b, and 114c include responses to the poll (e.g., radio buttons corresponding to "Yes" and "No" answers) and a "Submit" button. Those skilled in the art will appreciate that the supplemental content 110 can take various forms and include various features and/or functionalities in addition to or instead of the example shown in FIG. 1. For example, the supplemental content may be information or statistics related to the occurrence depicted in the media content 104; highlights, replays, augmented graphics or audio features related to the occurrence depicted in the media content 104; questionnaires, voting options, polling options, etc.; and/or any other supplemental interactive or augmented content related to the occurrence depicted in the media content 104.

Figure 2:
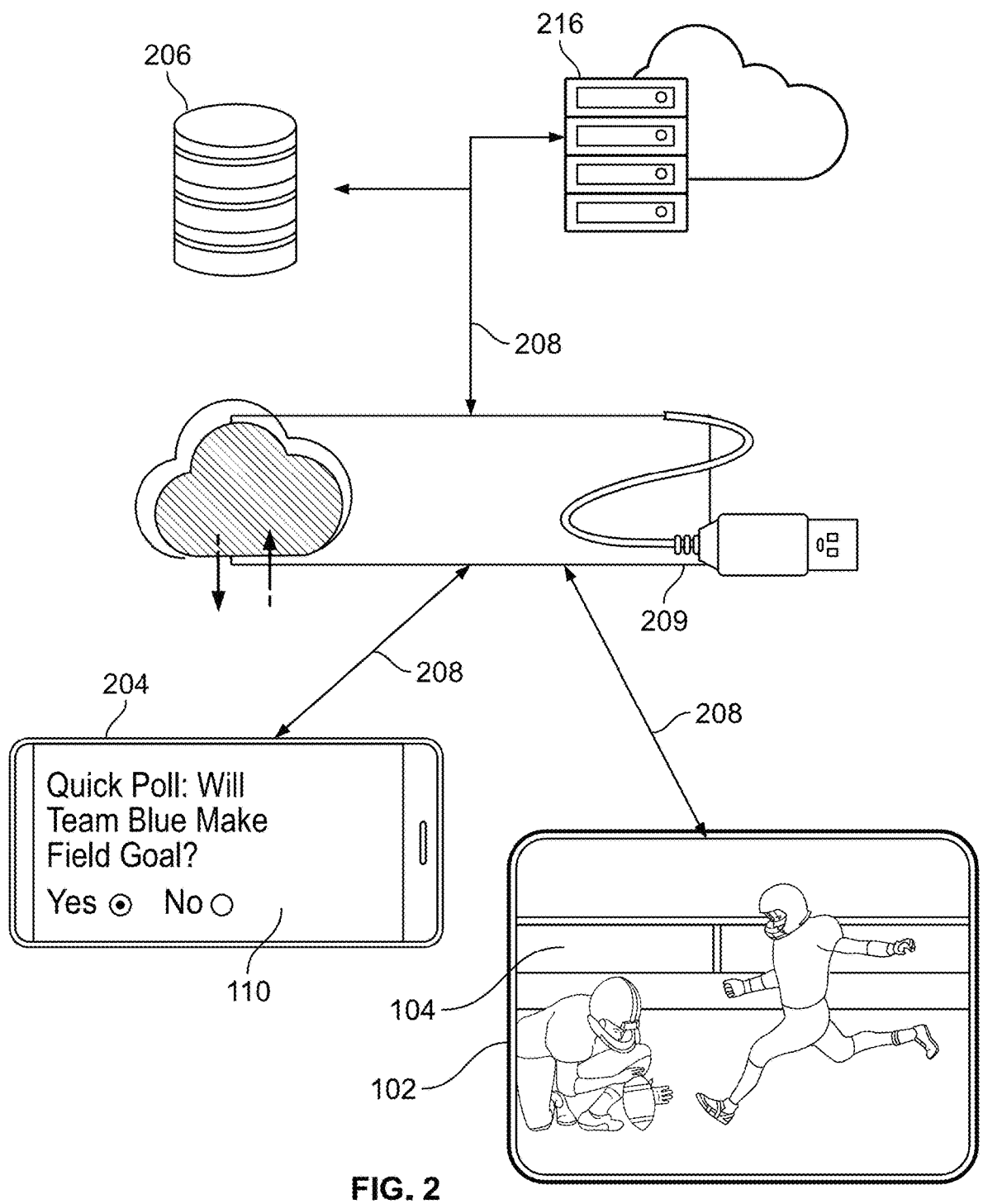
FIG. 2 shows an illustrative media system for providing supplemental content to different user devices, in accordance with some embodiments of the disclosure.

FIG. 2 shows an illustrative media system for providing supplemental content to different user devices. In particular, FIG. 2 shows a system 200 where the media consumption device 102 displays the media content 104 received from a content source 206 via a communication link 208. The content source 206 may be any server, broadcasting, or transmission equipment by means of which a content provider provides the media content 104 and/or supplemental content 110 to the media consumption device 102 and/or a second device 204. In that regard, the communication link 208 may be any network or communication equipment or medium by means of which the media content 104 can be provided by the content source 206 to the media consumption device 102. In one illustrative example, the communication link 208 includes devices connected via the Internet.

In system 200, the supplemental content 110 is displayed on the second device 204. The second device 204 can be any television, desktop computer, laptop computer, tablet computer, smartphone, wearable computer, augmented reality display device, speaker or other audio output device, and/or any other display device or audio output device usable to consume and/or interact with the supplemental content 110. Similar to the media content 104, the supplemental content 110 is provided by the content source 206 to the second device 204 by means of the communication link 208.

A content generation application may be implemented on any one or a combination of the media consumption device 102, the second device 204, the content source 206, and/or a processing server 216, each of which may function as a stand-alone device or may be part of a network of devices. Various network configurations of devices may be implemented and are discussed in more detail below. In the system 200, there may be multiple media devices, but only one of each is shown in FIG. 2 to avoid overcomplicating the drawing. In addition, each user may utilize more than one type of media device and also more than one of each type of media device.

The media consumption device 102 and second device 204 may be coupled to a communication network 209. The communication network 209 may be one or more networks including the Internet, a mobile phone network, mobile voice or data network (e.g., a 4G or LTE network), cable network, public switched telephone network, or other types of communications network or combinations of communications networks. The content source 206, the processing server 216, the media consumption device 102, and the second device 204 may be connected to the communication network 209 via one or more communications paths 208, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths 208 are not drawn directly between the media consumption device 102, the second device 204, and the content source 206 or the processing server 216, these devices may communicate directly with each other via communication paths 208, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 209.

The system 200 may include more than one content source 206, but only one is shown in FIG. 2 to avoid overcomplicating the drawing. The content source 206 may include one or more types of content distribution equipment including television distribution facilities, cable system headends, satellite distribution facilities, programming sources (e.g., television broadcasters, etc.), intermediate distribution facilities and/or servers, Internet providers, on-demand media servers, and other content providers. The content source 206 may be the originator of content (e.g., a television broadcaster, a Webcast provider, etc.) or may not be the originator of content (e.g., an on-demand content provider, an Internet provider of content of broadcast programs for downloading, etc.). The content source 206 may include cable sources, satellite providers, on-demand providers, Internet providers, over-the-top content providers, or other providers of content. The content source 206 may also include a remote media server used to store different types of content (including video content selected by a user), in a location remote from any of the media devices. Systems and methods for remote storage of content, and providing remotely stored content to user equipment, are discussed in greater detail in connection with Ellis et al., U.S. Pat. No. 7,761,892, issued Jul. 20, 2010, which is hereby incorporated by reference herein in its entirety. The content source 206 may also provide supplemental content, as described above and below, and/or metadata associated with the media content and supplemental content.

Metadata may include program information, supplemental content synchronization information, start time indications, end time indications, user preferences, user profile information, media listings, media-related information (e.g., broadcast times, broadcast channels, titles, descriptions, genre or category information, cast or player information, websites, and any other type of data that enables a computer to determine a start time and/or an end time of an occurrence depicted in the media content.

The content generation applications may be, for example, stand-alone applications implemented on the media devices described above. For example, the content generation application may be implemented as software or a set of executable instructions which may be stored in storage 308 (described below with reference to FIG. 3), and executed by control circuitry 304 (described below with reference to FIG. 3) of the media consumption device 102. In some embodiments, content generation applications are client/server applications where only a client application resides on the media device, and a server application resides on the processing server 216. For example, a content generation application may be implemented partially as a client application on the control circuitry 304 of the media device 102 and partially on the processing server 216 as a server application running on the control circuitry 304 of the processing server 216. When executed by the control circuitry 304 of the processing server 216, the content generation application may instruct the control circuitry 304 to generate the content generation application output (e.g., the supplemental content 110) and transmit the generated output to the media consumption device 102 and/or the second device 204. The server application may instruct the control circuitry 304 of the content source 216 to transmit metadata for synchronization of the supplemental content 110 and the media content 104 for display on media consumption device 102 and/or the second device 204. The client application may instruct the control circuitry 304 of the receiving media consumption device 102 and/or the second device 204 to generate the content generation application output (e.g., the supplemental content 110).

The media consumption device 102 and/or the second device 204 may operate in a cloud computing environment to access cloud services. In a cloud computing environment, various types of computing services for content sharing, storage or distribution (e.g., informational sites or social networking sites) are provided by a collection of network-accessible computing and storage resources, referred to as "the cloud." Cloud resources may be accessed by the media consumption device 102 and/or the second device 204 using, for example, a web browser, a desktop application, a mobile application, and/or any combination of access applications of the same. The media consumption device 102 and/or the second device 204 may be a cloud client that relies on cloud computing for application delivery, or the media consumption device 102 and/or the second device 204 may have some functionality without access to cloud resources. For example, some applications running on the media consumption device 102 may be cloud applications, that is, applications delivered as a service over the Internet, while other applications may be stored and run on the media consumption device 102. In some embodiments, the media consumption device 102 receives content from multiple cloud resources simultaneously. For example, the media consumption device 102 can stream video from one cloud resource while downloading supplemental content 110 from a second cloud resource. Or the media consumption device 102 can download media content 104 and supplemental content 110 from multiple cloud resources for more efficient downloading. In some embodiments, the media consumption device 102 uses cloud resources for processing operations, such as the processing operations performed by the processing circuitry 304 described in relation to FIG. 3.

FIG. 3 shows a generalized embodiment of illustrative media devices 300 and 301. As depicted, the media device 300 may be a smartphone or tablet, whereas the media device 301 may be a home media system that includes an equipment device 316 (e.g., a set-top box, CPU, videogame console, etc.) powered by a processor 324. The media devices 300 and 301 may receive content and data via an input/output (hereinafter "I/O") path 302. The I/O path 302 may provide media content (e.g., broadcast programming, on-demand programming, Internet content, content available over a local area network (LAN) or wide area network (WAN), and/or other content), supplemental content and data to control circuitry 304, which includes processing circuitry 306 and storage 308. The control circuitry 304 may be used to send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths, but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 304 executes instructions for a content generation application stored in memory (i.e., the storage 308). Specifically, the control circuitry 304 may be instructed by the content generation application to perform the functions discussed above and below.

In client/server-based embodiments, the control circuitry 304 includes communications circuitry suitable for communicating with a content generation application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage, described in relation to FIG. 2, may be used to supplement the storage 308 or instead of the storage 308.

The control circuitry 304 may include audio-generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. The control circuitry 304 may also include scaler circuitry for upconverting and downconverting content into the preferred output format of the media device 300. The control circuitry 304 may also include digital-to-analog converter circuitry and analog-to-digital converter circuitry for converting between digital and analog signals. The tuning and encoding circuitry may be used by the media device 300 to receive and to display, to play, or to record content. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If the storage 308 is provided as a separate device from the media device 300, the tuning and encoding circuitry (including multiple tuners) may be associated with the storage 308.

A user may send instructions to the control circuitry 304 using a user input interface 310 of the media device 300 or a user input interface 320 of the media device 301. The user input interface 310 and the user input interface 320 may be any suitable user interface, such as a remote control, mouse, trackball, keypad, keyboard, touch screen, touchpad, stylus input, joystick, voice recognition interface, or other user input interfaces. Display 312 may be a touchscreen or touch-sensitive display. In such circumstances, user input interface 310 may be integrated with or combined with the display 312. Display 322 may be provided as a stand-alone device or integrated with other elements of the media device 301. Speakers 314 may be provided as integrated with other elements of the media device 300. In the case of the media device 301, speakers 318 may be stand-alone units (e.g., smart speakers). The audio component of videos and other content displayed on the display 322 may be played through the speakers 318. In some embodiments, the audio is distributed to a receiver (not shown), which processes and outputs the audio via the speakers 318.

The content generation application may be implemented using any suitable architecture. For example, it may be a stand-alone application wholly implemented on the media device 300. The content generation application and/or any instructions for performing any of the embodiments discussed herein may be encoded on computer readable media. Computer-readable media includes any media capable of storing data. In some embodiments, the content generation application is a client/server-based application. Data for use by a thick or thin client implemented on the media device 300 or the media device 301 is retrieved on-demand by issuing requests to a server remote to the media device 300 or the media device 301, respectively. For example, the media device 300 may receive inputs from the user via the input interface 310 and transmit those inputs to the remote server for processing and generating the corresponding outputs. The generated output is then transmitted to the media device 300 for presentation to the user. Those skilled in the art will appreciate that media consumption device 102 of FIG. 1 and second device 204 of FIG. 2 may be implemented as media device 300 and/or media device 301 of FIG. 3.

Figure 4:
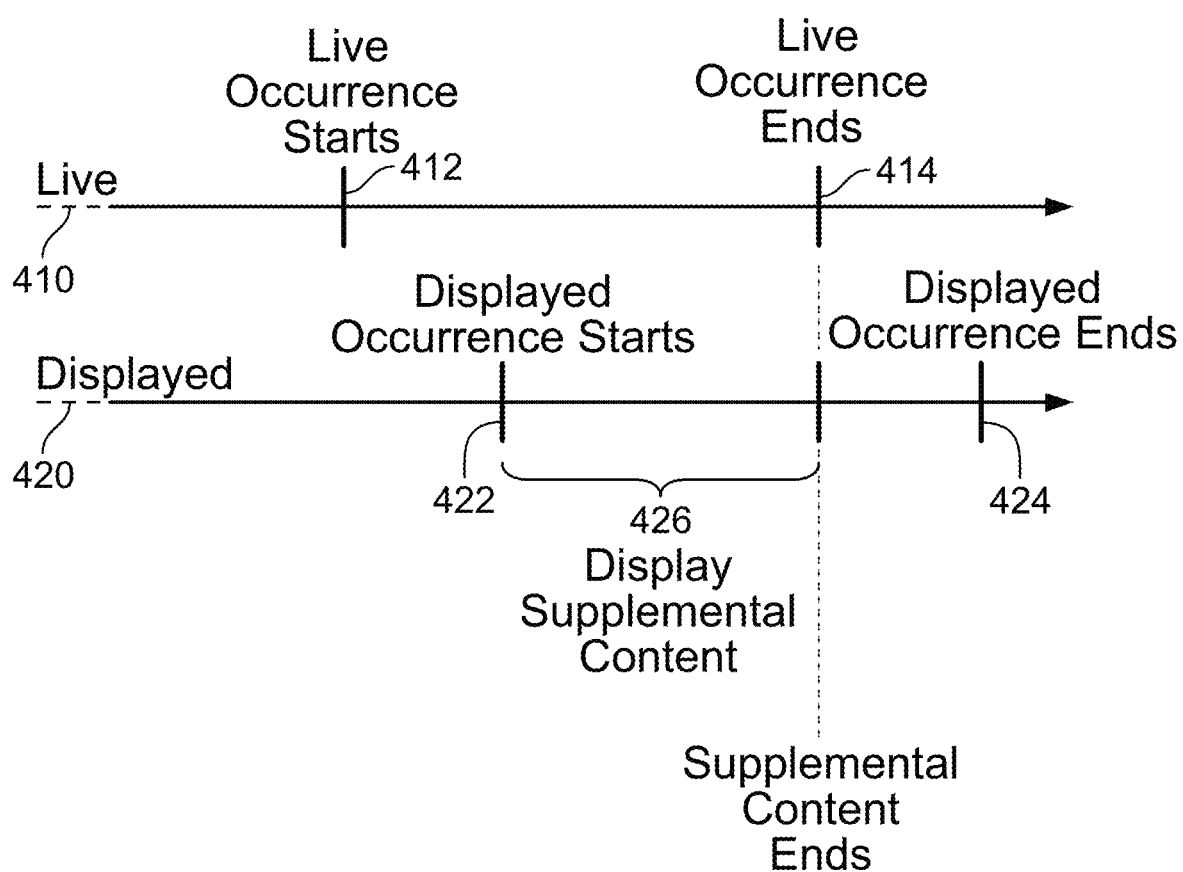
FIG. 4 shows a diagram of illustrative timelines for providing supplemental content related to an occurrence during a live event, in accordance with some embodiments of the disclosure.

FIG. 4 shows a diagram of illustrative timelines for providing supplemental content related to an occurrence during a live event, in accordance with some embodiments of the disclosure. In particular, FIG. 4 shows a timeline during which the supplemental content 110 is displayed in relation to a timeline during which the occurrence to which the supplemental content 110 is related happened. As shown in FIG. 4, a diagram 400 includes a live timeline 410 indicating relative times when an occurrence in a live event starts 412 and ends 414. The diagram 400 further includes a displayed timeline 420 indicating relative times when the occurrence in the live event is displayed in the media content 104 depicting the occurrence in the live event, including the times when the occurrence, as depicted in the media content 104, starts 422 and ends 424. Additionally, the diagram 400 shows the period 426 during which the supplemental content 110 is displayed.

In the example shown in FIG. 4, an occurrence in a live event starts at time 412. Media content, such as the media content 104, may be generated for display by the content source 206, the processing server 216, and/or the media consumption device 102. The media content 104 may be displayed on the media consumption device 102 in such a manner that, due to time-shifting caused by one or more of a processing delay, a transmission delay, and a user action affecting playback, a currently displayed portion of the live event as depicted in the media content 104 is delayed relative to the live event in real time. A content generation application executing on the content source 206, the processing server 216, and/or the media consumption device 102, then determines whether display of the occurrence has begun in the delayed playback of the media content 104. For example, the content generation application may retrieve metadata associated with the media content 104 and identify, in the metadata, an indication (e.g., a timestamp or other synchronization data) of the time 422 when display of a field goal attempt in a football game begins in the delayed playback of the media content 104.

The content generation application may further determine a start time of the occurrence in the live event in real time (i.e., the time 412). For example, the content generation application may retrieve metadata associated with the media content 104 and identify, in the metadata, an indication (e.g., a timestamp or other data) of the time 412 when the field goal attempt began in real time. The content generation application may then calculate an offset start time by adding the amount of delay between the live event in real time and depiction of the live event in the delayed playback of the media content 104, to the start time of the occurrence in the live event in real time. For example, if the field goal attempt began at 2:34.15 PM in real time, and the delay is 30 seconds, the field goal will begin at 2:34.45 PM in the delayed playback of the media content 104.

In yet another example, the content generation application may determine the beginning of the occurrence as depicted in the media content 104 (i.e., the time 422) by performing audio and/or image processing on the media content 104 to identify graphics or audio included in the media content 104 that indicate the beginning of the occurrence. In an embodiment, the content generation application applies pattern recognition and/or character recognition techniques to the media content 104 to identify text, graphics, objects, and/or actions performed by objects in the media content 104 that indicate the beginning of the occurrence. For example, the content generation application may identify a gesture or sign displayed by a referee of a football game indicating that a field goal attempt is about to commence. The content generation application may also apply audio signature analysis and matching techniques to audio included in the media content 104 to identify words indicating the beginning of the occurrence, or identify sounds (e.g., cheers, whistles, etc.) indicating the beginning of the occurrence.

While the supplemental content 110 is being generated for display, the content generation application determines whether the occurrence in the live event has ended in real time (i.e., the content generation application determines whether the time 414 has passed). For example, the content generation application may determine whether the field goal attempt has been completed in the real-life football game. In some embodiments, the content generation application retrieves metadata associated with the media content 104 and identifies, in the metadata, an indication (e.g., a timestamp or other synchronization data) of the time 414 when the occurrence ends in real time. In another embodiment, the content generation application determines the end of the occurrence in real time (i.e., the time 414) by performing audio and/or image processing on the media content 104 to identify graphics or audio included in the media content 104 that indicate the end of the occurrence. For example, the content generation application may apply pattern recognition and/or character recognition techniques to the media content 104 to identify text, graphics, objects, and/or actions performed by objects in the media content 104 that indicate the end of the occurrence. For example, the content generation application may identify a gesture or sign displayed by a referee of a football game indicating that a field goal attempt is complete. The content generation application may also apply audio signature analysis and matching techniques to audio included in the media content 104 to identify words indicating the end of the occurrence, or identify sounds (e.g., cheers, whistles, etc.) indicating the end of the occurrence.

Once the content generation application determines that the occurrence has ended in real time (i.e., that the time 414 has passed), the content generation application ceases generating for display the supplemental content 110. For example, the content generation application may stop transmitting the supplemental content 110 and/or send a signal or command, to the media consumption device 102 or the second device 204, to stop displaying or generating for display the supplemental content 110.

The content generation application may then determine whether the occurrence has ended in the delayed playback of the media content 104 (i.e., determine whether the time 424 has passed). The determining whether the occurrence has ended in the delayed playback of the media content 104 may be performed by similar processes as described above for determining the beginning of the occurrence in the delayed playback of the media content 104, and those processes are not repeated here for purposes of brevity.

Once the content generation application determines that the occurrence has ended in the delayed playback of the media content 104 (i.e., that the time 414 has passed), the content generation application may generate for display the additional supplemental content 110 related to the occurrence (e.g., the result of the poll).

Figure 5:
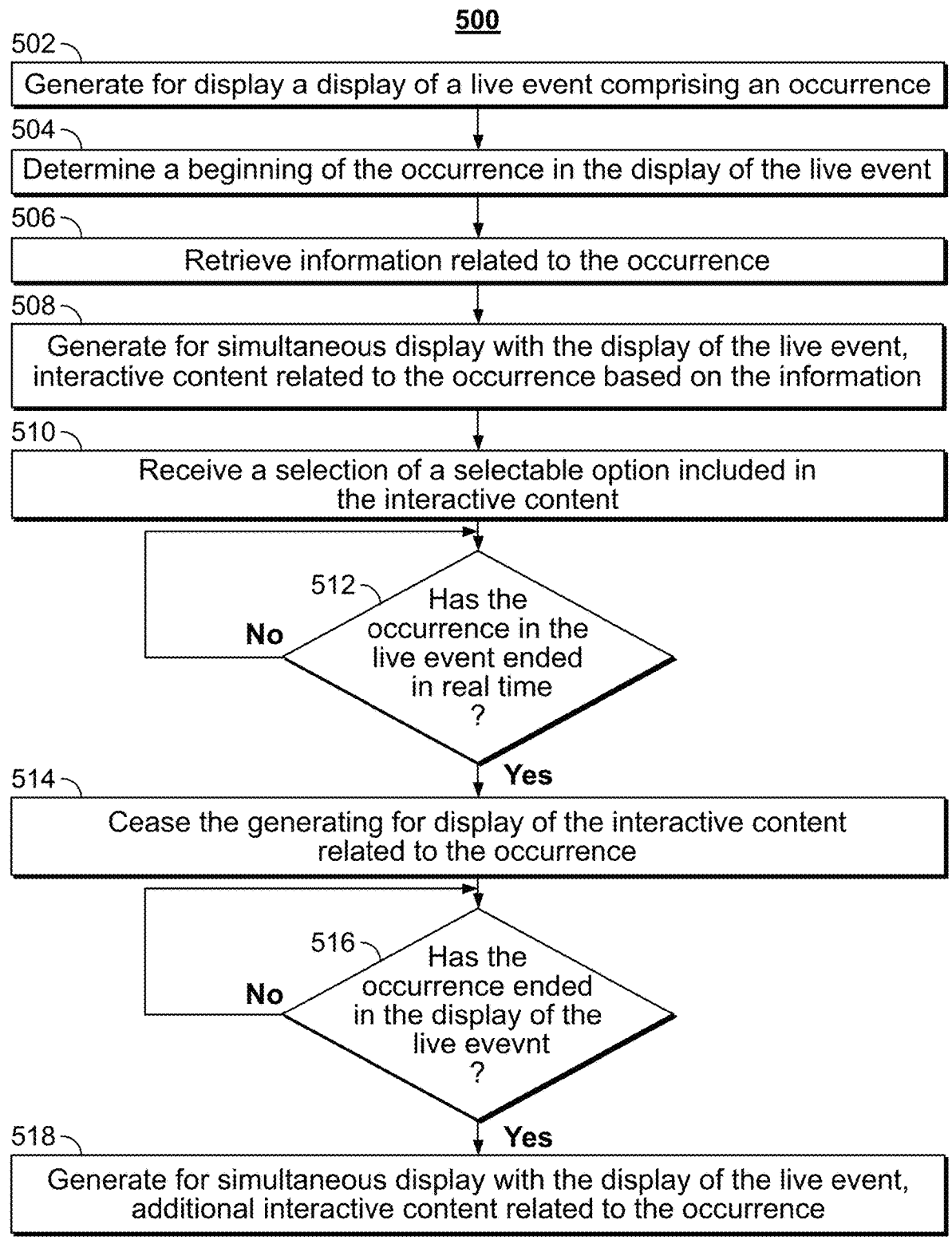
FIG. 5 is a flowchart of an illustrative process for providing supplemental content related to an occurrence during a live event, in accordance with some embodiments of the disclosure.

FIG. 5 is a flowchart of an illustrative process for providing supplemental content related to an occurrence during a live event, in accordance with some embodiments of the disclosure. A process 500 for providing supplemental content related to an occurrence during a live event may begin at block 502, where control circuitry, such as the control circuitry 304 described above, generates for display a display of a live event comprising an occurrence. The display of the live event may be media content, such as the media content 104 described above, and may be displayed on a media device, such as the media consumption device 102 described above. The live event may be an event happening in real time that is being captured, recorded, and/or at least transiently stored for distribution, such as via broadcast, streaming, or other transmission, as described above. For example, the live event may be a football game, and the occurrence in the live event may be a field goal attempt, as described above.

At block 504, the control circuitry 304 determines a beginning of the occurrence in the display of the live event. For example, the control circuitry 304 may determine whether display of the field goal attempt has begun in the playback of the media content 104. Subprocesses describing further details on how the control circuitry 304 determines the beginning of the occurrence in the display of the live event are described below with reference to FIGS. 7, 10, and 11.

At block 506, the control circuitry 304 retrieves information related to the occurrence. For example, the control circuitry 304 may retrieve the names and statistics of the players, and the teams for which they play, involved in the field goal attempt. The information may be stored in a database included in the content source 206 and/or other sources of information accessible via the communication network 209.

At block 508, the control circuitry 304 generates for simultaneous display, with the display of the live event, supplemental content, such as the supplemental content 110, related to the occurrence. The supplemental content 110 may be interactive content such as a poll, enhanced content such as statistics or other information related to the occurrence, and/or any of the other supplemental content 110 described above. In an embodiment where the supplemental content 110 is a poll, the control circuitry 304 generates the poll based on the information retrieved at block 506. The supplemental content 110 may be displayed overlaid onto the media content 104, and/or in such a way as not to obscure the media content 104. Alternatively, the supplemental content 110 may be displayed on a second device 204, as described above and below.

At block 510, the control circuitry 304 receives a selection of a selectable option included in the supplemental content 110. For example, as noted above, the supplemental content 110 may include selectable options 114*a*, 114*b*, and 114*c*, and the control circuitry 304 may receive an indication of a user selection of one or more of the selectable options 114*a*, 114*b*, and/or 114*c*.

At block 512, the control circuitry 304 determines whether the occurrence in the live event has ended in real time. For example, the control circuitry 304 may determine whether the field goal attempt has ended in the football game in real time. Subprocesses describing further details on how the control circuitry 304 determines whether the occurrence in the live event has ended in real time are described below with reference to FIG. 6. In response to determining that the occurrence in the live event has not ended in real time, process 500 repeats block 512. In response to determining that the occurrence in the live event has ended in real time, process 500 proceeds to block 514.

At block 514, the control circuitry 304 ceases generating for display the supplemental content 110 related to the occurrence. For example, the control circuitry 304 may stop transmitting the supplemental content 110 and/or send a signal or command to the media consumption device 102 or the second device 204 to stop displaying or generating for display the supplemental content 110.

At block 516, the control circuitry 304 determines whether the occurrence in the live event has ended in the display of the live event. For example, the control circuitry 304 may determine whether display of the field goal attempt in the football game has ended in the delayed playback of the media content 104. The control circuitry 304 may determine whether the occurrence in the live event has ended in the display of the live event by similar processes to those described above and below for determining the beginning of the occurrence in the display of the live event. In response to determining that the occurrence in the live event has not ended in the display of the live event, process 500 repeats block 516. In response to determining that the occurrence in the live event has ended in the display of the live event, process 500 proceeds to block 518.

At block 518, the control circuitry 304 generates for simultaneous display, with the display of the live event, additional supplemental content 110 related to the occurrence. For example, in embodiments where the supplemental content 110 includes a poll, the control circuitry 304 generates for display a result of the poll.

Figure 6:
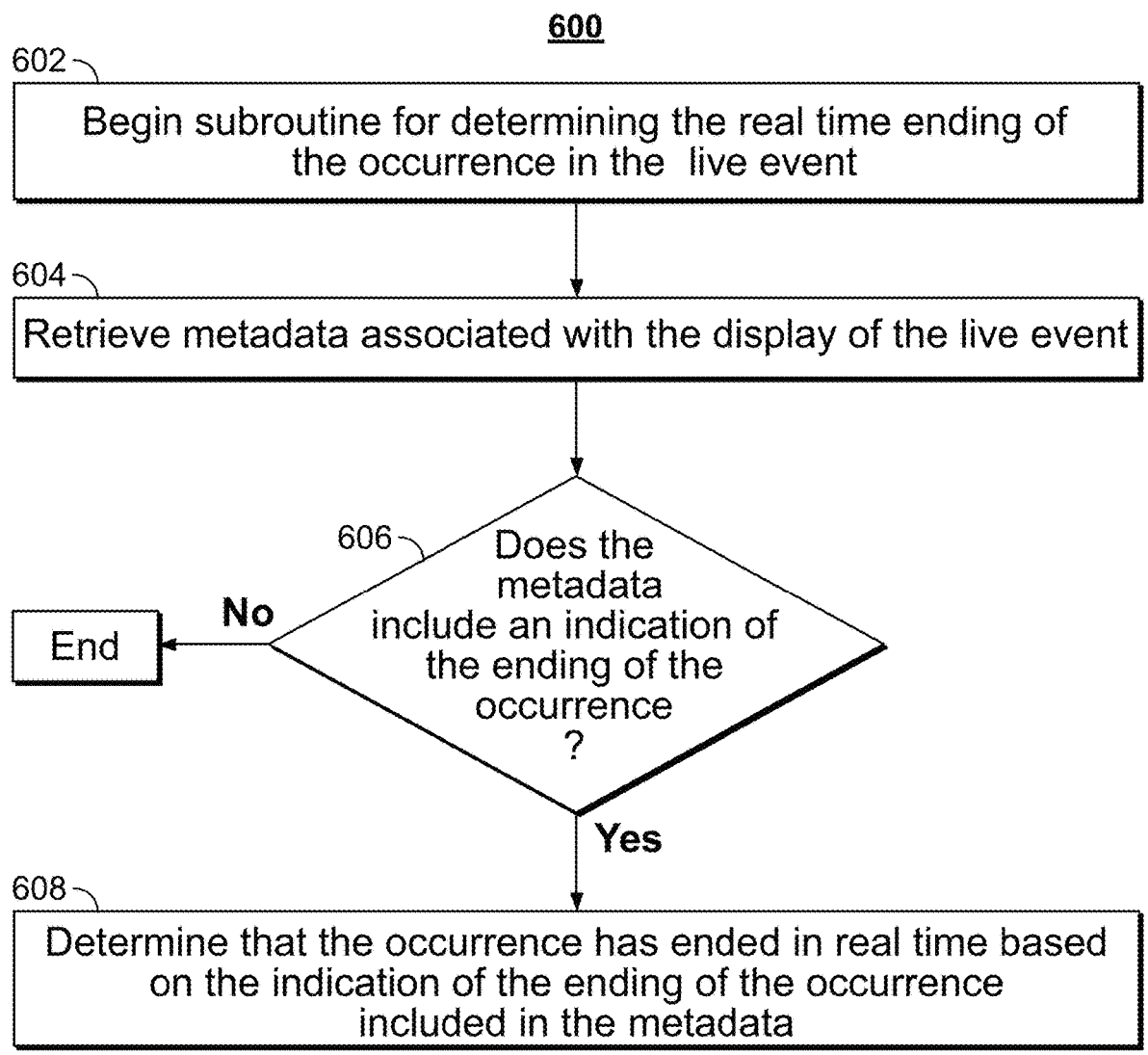
FIG. 6 is a flowchart of a detailed illustrative process for determining a real-time ending of an occurrence in a live event, in accordance with some embodiments of the disclosure.

FIG. 6 is a flowchart of a detailed illustrative process for determining a real-time ending of an occurrence in a live event, in accordance with some embodiments of the disclosure. A process 600 for determining a real-time ending of an occurrence in a live event may begin at block 702.

At block 604, the control circuitry 304 retrieves metadata associated with the display of the live event. For example, the metadata may be embedded in the media content 104, or the control circuitry 304 may retrieve the metadata separately from a database at the content source 206.

At block 606, the control circuitry 304 determines whether the metadata includes an indication of the ending of the occurrence in real time. For example, the control circuitry 304 may determine whether the metadata includes timestamps or other synchronization data indicating that the occurrence in the live event has ended in real time. In response to determining that the metadata does not include an indication of the ending of the occurrence in real time, process 600 ends. In response to determining that the metadata includes an indication of the ending of the occurrence in real time, process 600 proceeds to block 608.

At block 608, the control circuitry 304 determines that the occurrence has ended in real time based on the indication of the ending of the occurrence included in the metadata. For example, the control circuitry 304 may identify a timestamp indicating the ending of the occurrence in the live event in real time, and may determine, based on the existence of the timestamp, that the occurrence in the live event has ended in real time.

Figure 7:
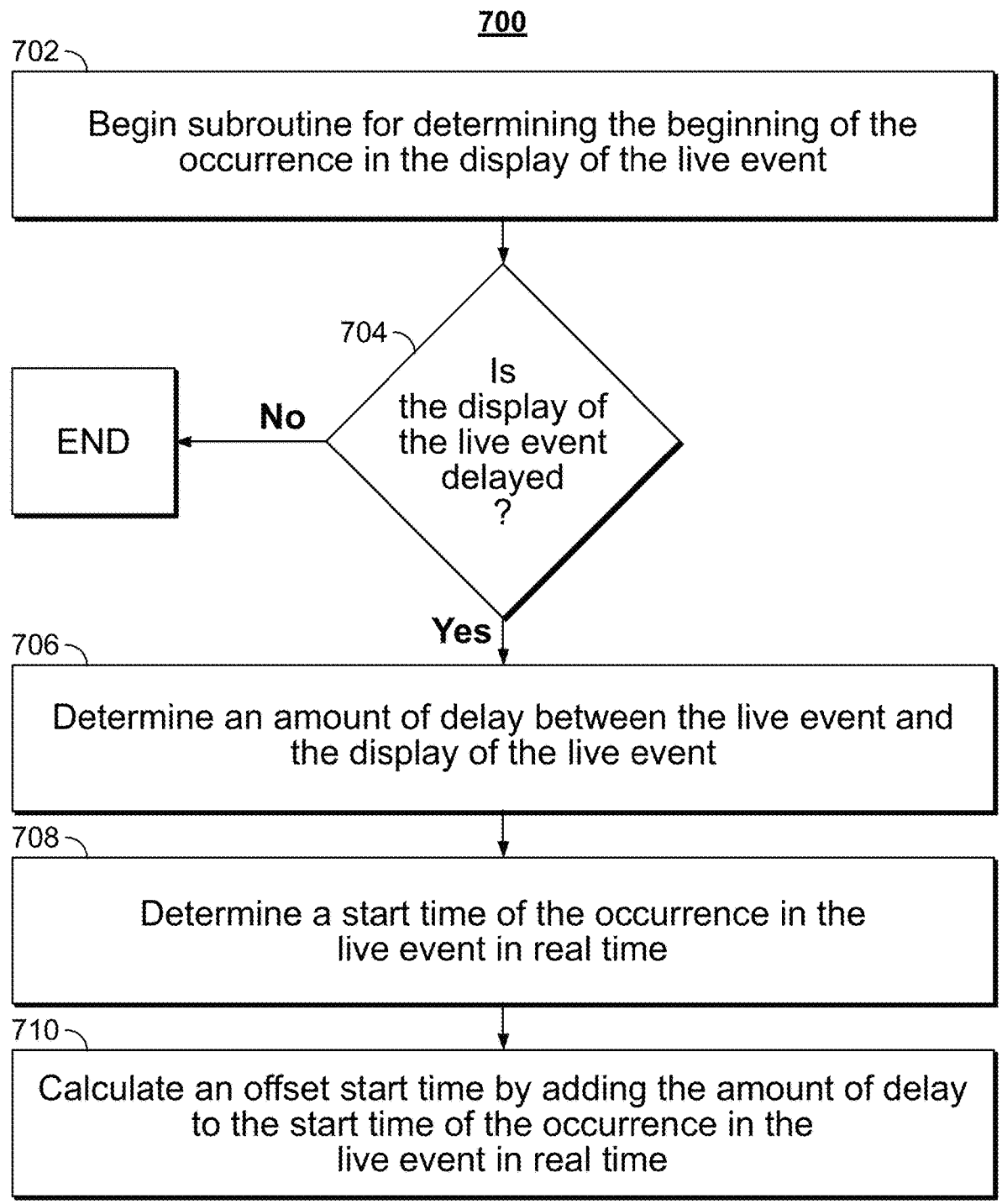
FIG. 7 is a flowchart of a detailed illustrative process for determining a beginning of an occurrence in a display of a live event, in accordance with some embodiments of the disclosure.

FIG. 7 is a flowchart of a detailed illustrative process for determining a beginning of an occurrence in a display of a live event, in accordance with some embodiments of the disclosure. A process 700 for determining a beginning of an occurrence in a display of a live event may begin at block 702.

At block 704, the control circuitry 304 determines whether the display of the live event is delayed. For example, the control circuitry 304 may determine whether the media content 104 is being played back from a live transmission, or is time-shifted from the live transmission. In response to determining that the display of the live event is not delayed, the process 700 ends. In response to determining that the display of the live event is delayed, the process 700 proceeds to block 706.

At block 706, the control circuitry 304 determines an amount of delay between the live event and the display of the live event. For example, the control circuitry 304 may determine an amount of time that playback of the media content 104 is behind the live transmission. Subprocesses describing further details on how the control circuitry 304 determines the amount of delay between the live event and the display of the live event are described below with reference to FIGS. 8 and 9.

At block 708, the control circuitry 304 determines a start time of the occurrence in the live event in real time. For example, the control circuitry 304 may determine a time when the field goal attempt started in real time. In some embodiments, the control circuitry 304 retrieves metadata associated with the media content 104 and identifies in the metadata a timestamp or other synchronization data indicating a start time of the occurrence in the live event in real time.

At block 710, the control circuitry 304 calculates an offset start time of the occurrence (i.e., the start time of the occurrence in the delayed playback of the media content 104). In some embodiments, the control circuitry 304 calculates the offset start time by adding the amount of delay determined at block 706 to the start time of the occurrence in the live event in real time determined at block 708.

Figure 8:
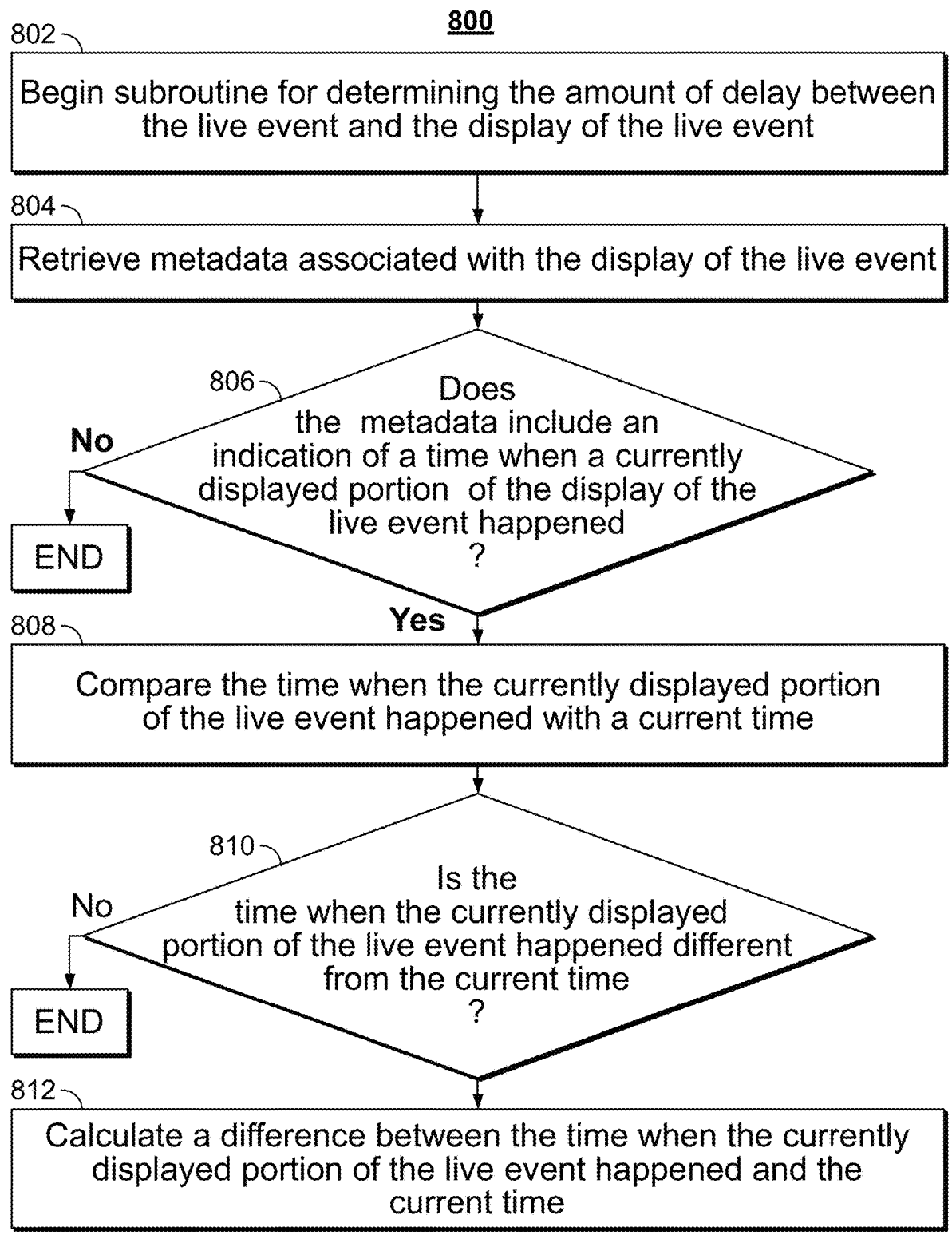
FIG. 8 is a flowchart of a detailed illustrative process for determining an amount of delay between a live event and a display of a live event, in accordance with some embodiments of the disclosure.

FIG. 8 is a flowchart of a detailed illustrative process for determining an amount of delay between a live event and a display of a live event, in accordance with some embodiments of the disclosure. A process 800 for determining an amount of delay between a live event and a display of the live event may begin at block 802.

At block 804, the control circuitry 304 retrieves metadata associated with the display of the live event. For example, the metadata may be embedded in the media content 104, or the control circuitry 304 may retrieve the metadata separately from a database at the content source 206.

At block 806, the control circuitry determines whether the metadata includes an indication of a time when a currently displayed portion of the display of the live event happened. For example, the control circuitry may identify, in the metadata, an indication (e.g., a timestamp or other synchronization data) of a time when a currently displayed portion of the media content 104 happened in the live event in real time. In response to determining that the metadata does not include an indication of the time when the currently displayed portion of the display of the live event happened, the process 800 ends. In response to determining that the metadata includes an indication of the time when the currently displayed portion of the display of the live event happened, the process 800 proceeds to block 808.

At block 808, the control circuitry 304 compares the time when the currently displayed portion of the live event happened with a current time. For example, the control circuitry may compare a timestamp included in the metadata indicating the time when the currently displayed portion of the media content 104 happened with a current time.

At block 810, the control circuitry determines whether the time when the currently displayed portion of the live event happened is different from the current time. In response to determining that the time when the currently displayed portion of the live event happened is not different from the current time, process 800 ends. In response to determining that the time when the currently displayed portion of the live event happened is different from the current time, process 800 proceeds to block 812.

At block 812, the control circuitry 304 calculates a difference between the time when the currently displayed portion of the live event happened and the current time. For example, the control circuitry 304 may subtract the time when the currently displayed portion of the media content 104 happened in real time from the current time, and the result will be the difference.

FIG. 9 is a flowchart of another detailed illustrative process for determining an amount of delay between a live event and a display of a live event, in accordance with some embodiments of the disclosure. A process 900 for determining an amount of delay between a live event and a display of the live event may begin at block 902.

At block 904, the control circuitry 304 determines whether a user action affecting playback of the display of the live event has been performed. For example, the control circuitry 304 may determine whether playback of the media content 104 has been paused, rewound, fast-forwarded, etc. In response to determining that a user action affecting playback of the display of the live event has not been performed, process 900 ends. In response to determining that a user action affecting playback of the display of the live event has been performed, process 900 proceeds to block 906.

At block 906, the control circuitry 304 calculates an amount of time-shifting of the display of the live event has been caused by the user action affecting playback of the display of the live event. For example, the control circuitry 304 may calculate for how long the user has paused playback of the media content 104.

At block 908, the control circuitry 304 calculates a difference between the live event and the currently displayed portion of the display based on the amount of time-shifting. For example, if the control circuitry 304 determines at block 906 that the user has paused playback of the media content 104 for 30 seconds, the control circuitry may calculate at block 908 that the difference (e.g., the delay) between the live event and the currently displayed portion of the media content 104 is 30 seconds.

Figure 10:
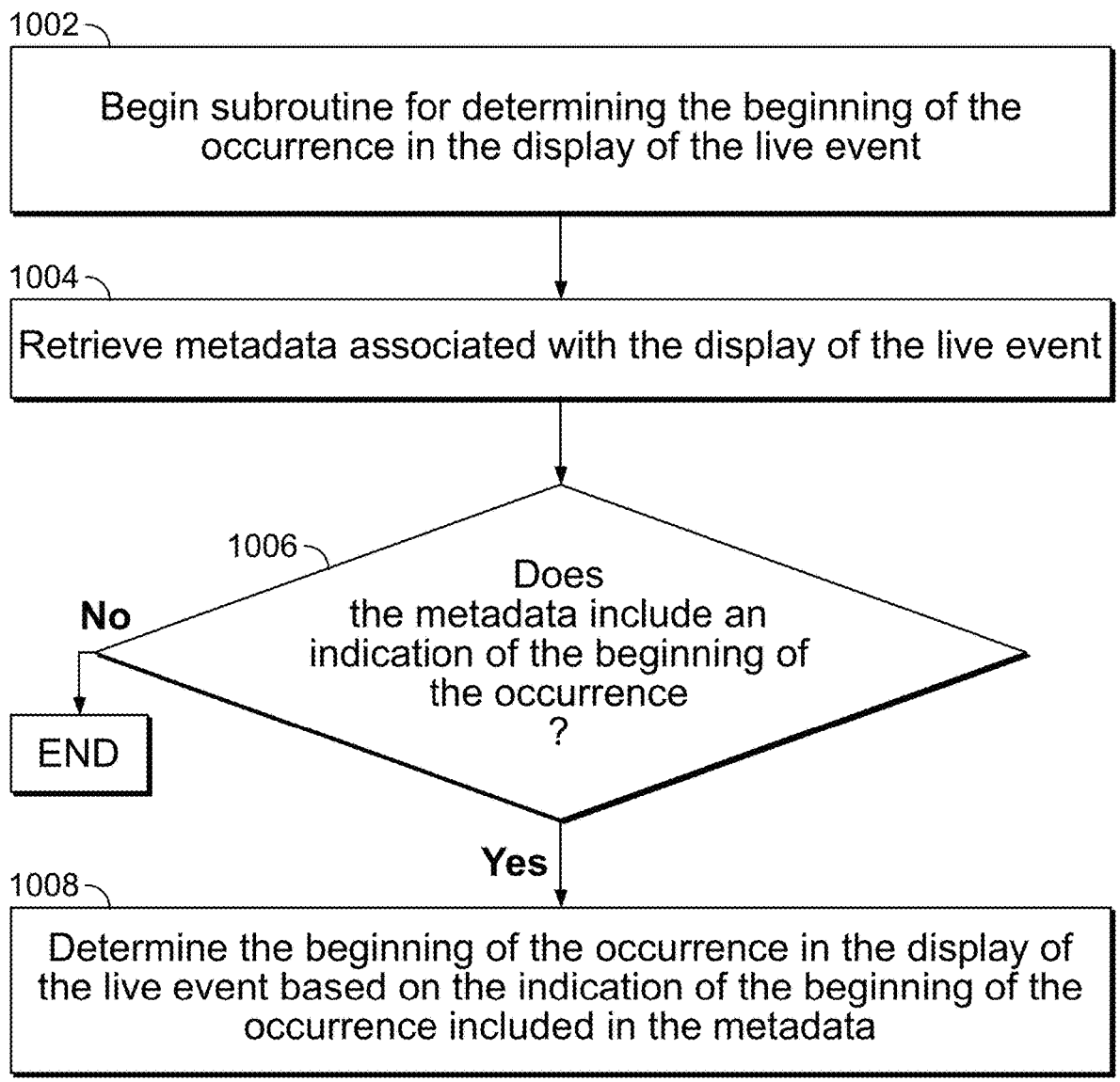
FIG. 10 is a flowchart of a detailed illustrative process for determining a beginning of an occurrence in a display of a live event, in accordance with some embodiments of the disclosure.

FIG. 10 is a flowchart of a detailed illustrative process for determining a beginning of an occurrence in a display of a live event, in accordance with some embodiments of the disclosure. A process 1000 for determining a beginning of an occurrence in a display of a live event may begin at block 1002.

At block 1004, the control circuitry 304 retrieves metadata associated with the display of the live event. For example, the metadata may be embedded in the media content 104, or the control circuitry 304 may retrieve the metadata separately from a database at the content source 206.

At block 1006, the control circuitry 304 determines whether the metadata includes an indication of the beginning of the occurrence in the display of the live event. For example, the control circuitry 304 may identify, in the metadata, an indication (e.g., a timestamp or other synchronization data) of the time 422 when display of a field goal attempt in a football game begins in the delayed playback of the media content 104. In response to determining that the metadata does not include an indication of the beginning of the occurrence in the display of the live event, process 1000 ends. In response to determining that the metadata does include an indication of the beginning of the occurrence in the display of the live event, the process 1000 proceeds to block 1008.

At block 1008, the control circuitry 304 determines the beginning of the occurrence in the display of the live event based on the indication of the beginning of the occurrence included in the metadata. For example, the control circuitry 304 may determine that the time 422 corresponds to the beginning of the field goal attempt based on a timestamp included in the metadata.

Figure 11:
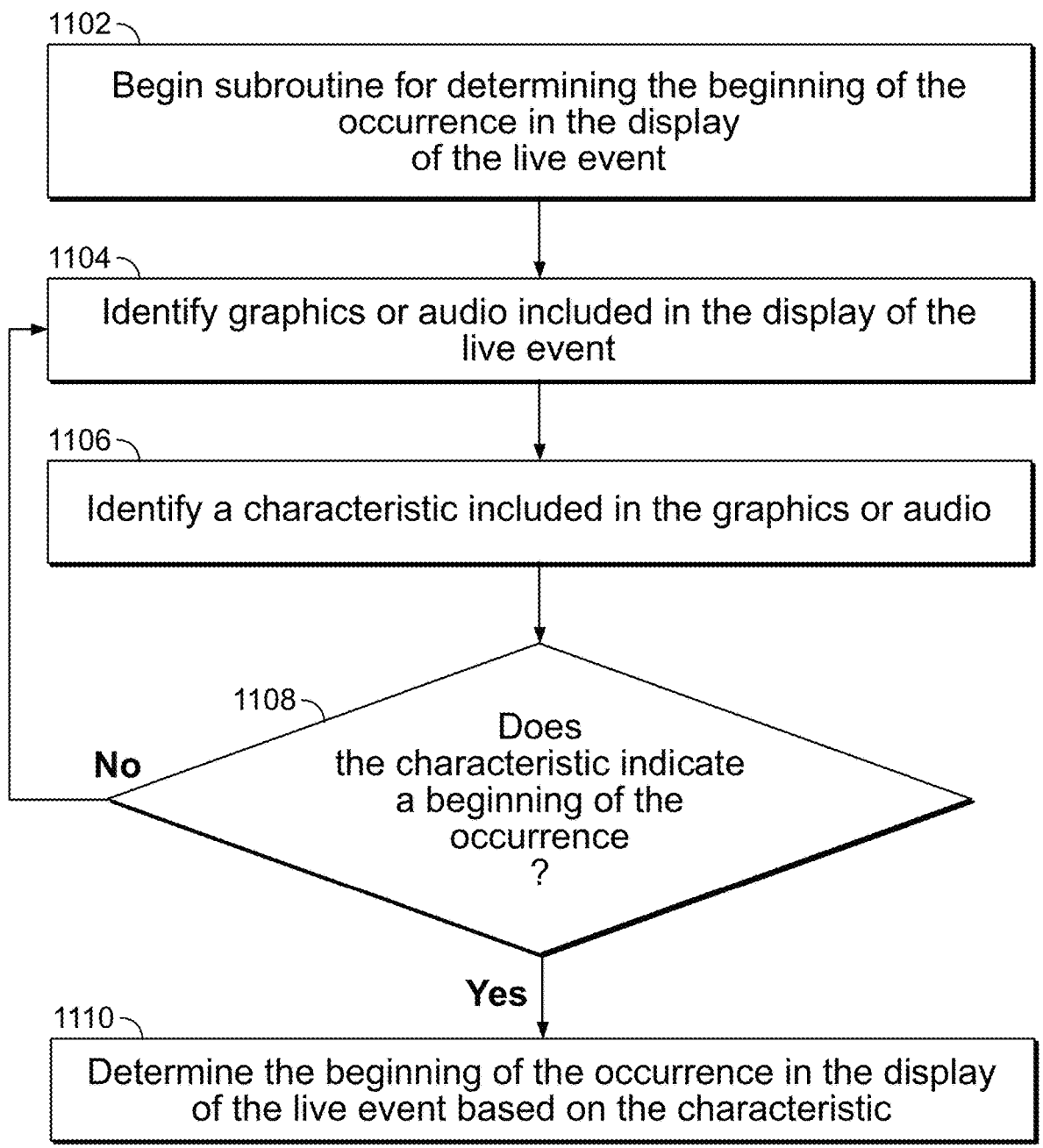
FIG. 11 is a flowchart of another detailed illustrative process for determining a beginning of an occurrence in a display of a live event, in accordance with some embodiments of the disclosure.

FIG. 11 is a flowchart of another detailed illustrative process for determining a beginning of an occurrence in a display of a live event, in accordance with some embodiments of the disclosure. A process 1100 for determining the beginning of the occurrence in the display of the live event may begin at block 1102.

At block 1104, the control circuitry 304 identifies graphics or audio included in the display of the live event. For example, the control circuitry 304 may perform audio and/or image processing on the media content 104 to identify graphics or audio included in the media content 104 that indicate the beginning of the occurrence. In an embodiment, the control circuitry 304 applies pattern recognition and/or character recognition techniques to the media content 104 to identify text, graphics, objects, and/or actions performed by objects in the media content 104 that indicate the beginning of the occurrence.

At block 1106, the control circuitry 304 identifies a characteristic included in the graphics or audio identified at block 1104. For example, the control circuitry 304 may identify a gesture or sign displayed by a referee of a football game indicating that a field goal attempt is about to commence. The control circuitry 304 may also apply audio signature analysis and matching techniques to audio included in the media content 104 to identify words indicating the beginning of the occurrence, or identify sounds (e.g., cheers, whistles, etc.) indicating the beginning of the occurrence.

At block 1108, the control circuitry 304 determines whether the characteristic identified at block 1106 indicates a beginning of the occurrence. In response to determining that the characteristic does not indicate the beginning of the occurrence, process 1100 returns to block 1104 to identify additional graphics or audio included in the display of the live event. In response to determining that the characteristic does indicate the beginning of the occurrence, process 1100 proceeds to block 1110.

At block 1110, the control circuitry 304 determines the beginning of the occurrence in the display of the live event based on the characteristic. For example, the control circuitry 304 may determine that a hand signal displayed by a referee of the football game indicates that a field goal attempt is about to begin.

Figure 12:
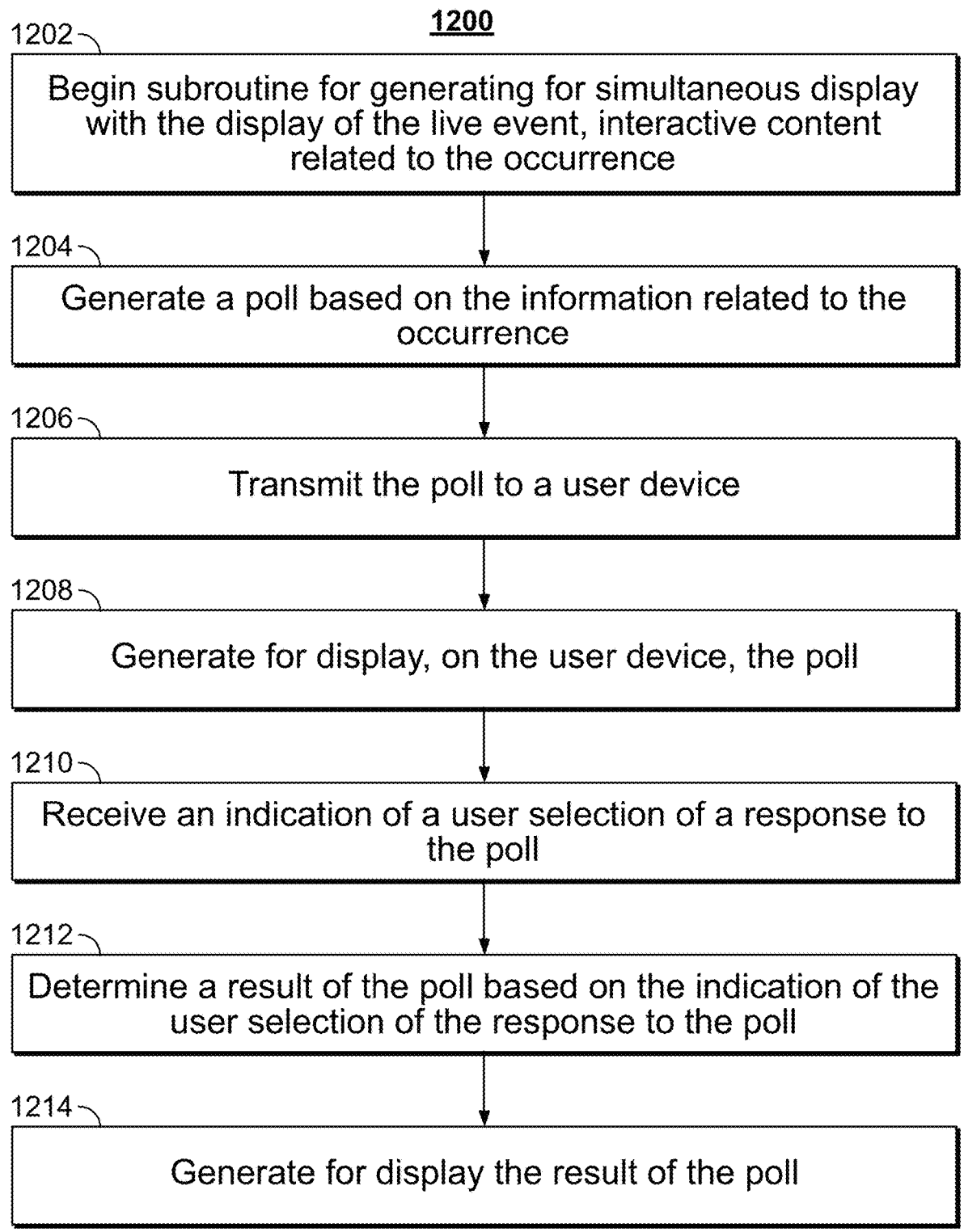
FIG. 12 is a flowchart of a detailed illustrative process for generating for simultaneous display, with a display of a live event, supplemental content related to an occurrence, in accordance with some embodiments of the disclosure.

FIG. 12 is a flowchart of a detailed illustrative process for generating for simultaneous display, with a display of a live event, supplemental content related to an occurrence, in accordance with some embodiments of the disclosure. A process 1200 for generating for simultaneous display, with the display of the live event, interactive content related to the occurrence may begin at block 1202.

At block 1204, the control circuitry 304 generates a poll based on information related to the occurrence, such as the information retrieved at block 606. For example, the control circuitry 304 may generate a poll asking a user to predict and/or vote on whether the field goal attempt will be successful. In some embodiments, the supplemental content includes an option to place a wager or bet on the outcome of the occurrence. For example, the control circuitry 304 may generate a wagering or betting option allowing the user to place a wager on whether the field goal attempt will be successful.

At block 1206, the control circuitry 304 transmits the poll to a user device, such as the second device 204. In some embodiments, the supplemental content 110 is generated at, or transmitted to, the second device 204.

At block 1208, the control circuitry 304 generates for display, on the user device, the poll. For example, while generating for display the media content 104 on the media consumption device 102, the control circuitry 304 may generate for display, on the second device 204, the poll.

At block 1210, the control circuitry receives an indication of a user selection of a response to the poll. For example, the control circuitry 304 may receive, such as via the user input interface 320, a user selection of a selectable option included in the supplemental content 110. In some embodiments, the control circuitry 304 receives a user selection of a "yes" button indicating that the user predicts that the field goal attempt will be successful. In some embodiments, the user selection of the selectable option is received via the second device 204.

At block 1212, the control circuitry 304 determines a result of the poll based on the indication of the user selection of the response to the poll received at block 1210. For example, the control circuitry 304 may receive answers to the poll from multiple users via media consumption devices 102 and/or second devices 204, and may aggregate the answers to determine a result of the poll.

At block 1214, the control circuitry 304 generates for display the result of the poll. For example, the additional supplemental content 110 generated for display at block 618 may include the result of the poll determined at block 1212.

It should be noted that processes 500-1200 or any step thereof could be performed on, or provided by, any of the devices shown in FIGS. 1-3. For example, the processes may be executed by control circuitry 304 (FIG. 3) as instructed by a content generation application implemented on media consumption device 102, content source 206, and/or processing server 216. In addition, one or more steps of a process may be omitted, modified, and/or incorporated into or combined with one or more steps of any other process or embodiment (e.g., steps from process 600 may be combined with steps from process 800). In addition, the steps and descriptions described in relation to FIGS. 5-12 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or-readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving a stream of media content, wherein the media content corresponds to a live event;
   processing the media content to identify metadata indicative of a beginning of a live event in the media content;
   in response to identifying the metadata indicative of the beginning of the live event in the media content:
   generating for presentation a user interface element comprising a prompt to input a prediction associated with the live event; and
   determining whether the live event has ended in real-time; and
   in response to determining that the live event has ended in real-time, cease generating for presentation the user interface element.

2. The method of claim 1, wherein processing the media content to identify the metadata indicative of the beginning of the live event in the media content comprises:
   performing audio processing to identify audio features of the media content indicative of the beginning of the live event.

3. The method of claim 1, wherein processing the media content to identify the metadata indicative of the beginning of the live event in the media content comprises:
   performing image processing to identify graphics, objects, or text of the media content indicative of the beginning of the live event.

4. The method of claim 1, wherein the media content is delayed relative to the live event.

5. The method of claim 1, wherein the metadata comprises a keyword indicating the live event has begun.

6. The method of claim 1, wherein the metadata comprises a timestamp indicating a real-time time point at which the live event began.

7. The method of claim 1, wherein the metadata is embedded in the media content or is retrieved separately from the media content.

8. The method of claim 1, wherein generating for presentation the user interface element comprising the prompt to input the prediction associated with the live event comprises:
   retrieving information related to the live event; and
   generating the user interface element based on the information related to the live event, wherein the prompt includes statistics related to a predicted outcome of the live event.

9. The method of claim 8, further comprising:
   receiving, from each of a plurality of user devices, a corresponding prediction associated with the live event;
   aggregating the predictions received from the plurality of user devices; and
   in response to determining that the live event has ended in real-time, generating for presentation statistics related to the predictions received from the plurality of user devices.

10. The method of claim 1, wherein the media content is generated for presentation on a first device, and the user interface element comprising the prompt is generated for presentation on a second device that is different from the first device.

11. A system comprising:
    memory; and
    control circuitry configured to:
    receive a stream of media content, wherein the media content corresponds to a live event;
    process the media content to identify metadata indicative of a beginning of a live event in the media content, wherein the metadata is stored in memory;
    in response to identifying the metadata indicative of the beginning of the live event in the media content:
    generate for presentation a user interface element comprising a prompt to input a prediction associated with the live event; and determine whether the live event has ended in real-time; and in response to determining that the live event has ended in real-time, cease generating for presentation the user interface element.

12. The system of claim 11, wherein the control circuitry is configured to process the media content to identify the metadata indicative of the beginning of the live event in the media content by:

performing audio processing to identify audio features of the media content indicative of the beginning of the live event.

13. The system of claim 11, wherein the control circuitry is configured to process the media content to identify the metadata indicative of the beginning of the live event in the media content by:

performing image processing to identify graphics, objects, or text of the media content indicative of the beginning of the live event.

14. The system of claim 11, wherein the media content is delayed relative to the live event.

15. The system of claim 11, wherein the metadata comprises a keyword indicating the live event has begun.

16. The system of claim 11, wherein the metadata comprises a timestamp indicating a real-time time point at which the live event began.

17. The system of claim 11, wherein the metadata is embedded in the media content or is retrieved separately from the media content.

18. The system of claim 11, wherein the control circuitry is configured to generate for presentation the user interface element comprising the prompt to input the prediction associated with the live event by:

retrieving information related to the live event; and generating the user interface element based on the information related to the live event, wherein the prompt includes statistics related to a predicted outcome of the live event.

19. The system of claim 18, wherein the control circuitry is further configured to:

receive, from each of a plurality of user devices, a corresponding prediction associated with the live event;

aggregate the predictions received from the plurality of user devices; and in response to determining that the live event has ended in real-time, generate for presentation statistics related to the predictions received from the plurality of user devices.

20. The system of claim 11, wherein the media content is generated for presentation on a first device, and the user interface element comprising the prompt is generated for presentation on a second device that is different from the first device.

* * * * *